United States Patent [19]

Balachandran et al.

[11] Patent Number: 5,356,728
[45] Date of Patent: Oct. 18, 1994

[54] CROSS-FLOW ELECTROCHEMICAL REACTOR CELLS, CROSS-FLOW REACTORS, AND USE OF CROSS-FLOW REACTORS FOR OXIDATION REACTIONS

[75] Inventors: Uthamalingam Balachandran, Hinsdale; Roger B. Poeppel, Glen Ellyn; Mark S. Kleefisch, Naperville; Thaddeus P. Kobylinski, Lisle; Carl A. Udovich, Joliet, all of Ill.

[73] Assignee: Amoco Corporation, Chicago, Ill.

[21] Appl. No.: 48,668

[22] Filed: Apr. 16, 1993

[51] Int. Cl.⁵ ............................................. H01M 8/00
[52] U.S. Cl. .......................................... 429/8; 429/13; 429/30; 429/31; 429/32; 204/270; 204/277; 204/278
[58] Field of Search ....................... 429/30, 31, 32, 13, 429/8; 204/270, 277, 278, 248

[56] References Cited

U.S. PATENT DOCUMENTS

| | | | |
|---|---|---|---|
| 4,426,196 | 10/1984 | Poeppel et al. | 429/32 |
| 4,476,197 | 10/1984 | Hercey | 429/32 |
| 4,883,497 | 11/1989 | Claar et al. | 429/33 X |
| 4,948,680 | 8/1990 | Madou et al. | 429/13 |
| 4,950,562 | 8/1990 | Yoshida et al. | 429/32 |
| 5,134,042 | 7/1992 | Madou et al. | 429/13 |

Primary Examiner—Prince Willis, Jr.
Assistant Examiner—M. Nuzzolillo
Attorney, Agent, or Firm—Ronald S. Courtney; Wallace L. Oliver

[57] ABSTRACT

This invention discloses cross-flow electrochemical reactor cells containing oxygen permeable materials which have both electron conductivity and oxygen ion conductivity, cross-flow reactors, and electrochemical processes using cross-flow reactor cells having oxygen permeable monolithic cores to control and facilitate transport of oxygen from an oxygen-containing gas stream to oxidation reactions of organic compounds in another gas stream. These cross-flow electrochemical reactors comprise a hollow ceramic blade positioned across a gas stream flow or a stack of crossed hollow ceramic blades containing a channel or channels for flow of gas streams. Each channel has at least one channel wall disposed between a channel and a portion of an outer surface of the ceramic blade, or a common wall with adjacent blades in a stack comprising a gas-impervious mixed metal oxide material of a perovskite structure having electron conductivity and oxygen ion conductivity. The invention includes reactors comprising first and second zones seprated by gas-impervious mixed metal oxide material material having electron conductivity and oxygen ion conductivity. Prefered gas-impervious materials comprise at least one mixed metal oxide having a perovskite structure or perovskite-like structure. The invention includes, also, oxidation processes controlled by using these electrochemical reactors, and these reactions do not require an external source of electrical potential or any external electric circuit for oxidation to proceed.

24 Claims, 4 Drawing Sheets

CROSS-FLOW ELECTROCHEMICAL REACTOR CELLS, CROSS-FLOW REACTORS, AND USE OF CROSS-FLOW REACTORS FOR OXIDATION REACTIONS

BACKGROUND OF THE INVENTION

This invention relates to electrochemical reactors useful to control partial oxidation reactions of organic compounds to added-value products. In particular, this invention relates to cross-flow electrochemical reactor cells containing oxygen permeable materials which have both electron conductivity and oxygen ion conductivity, and cross-flow reactors and electrochemical processes using cross-flow reactor cells having oxygen permeable monolithic cores to control and facilitate transport of oxygen from an oxygen-containing gas stream to oxidation reactions of organic compounds in another gas stream. These cross-flow electrochemical reactor cells comprise either a hollow ceramic blade positioned across a gas stream flow or a stack of crossed hollow ceramic blades containing a channel or channels for flow of gas streams. Each channel has at least one channel wall disposed between a channel and a portion of an outer surface of the ceramic blade or a common wall with adjacent blades in a stack comprising a gas-impervious mixed metal oxide material of a perovskite structure having electron conductivity and oxygen ion conductivity.

The invention includes reactors comprising first and second zones seprated by gas-impervious mixed metal oxide material having electron conductivity and oxygen ion conductivity. Prefered gas-impervious materials comprise at least one mixed metal oxide having a perovskite structure or perovskite-like structure. Also, the invention includes oxidation processes controlled by using these electrochemical reactors. Oxidation reactions conducted in cross-flow reactors according to this invention do not require an external source of electrical potential or any external electric circuit for oxidation to proceed.

U.S. Pat. No. 3,630,879 issued Dec. 28, 1971, in the name of Spacil et al., describes a solid oxygen ion electrolyte cell structure having a cylindrical form free of electrical conductors said to be useful to generate hydrogen gas by dissociation of water. Patentees describe the structure as a thin continuous cylinder of "internally short-circuited" solid oxygen ion material having a first continuous porous electrode over its inner surface and a second continuous porous electrode over its outer surface.

Ounalli et al. in "Hydrogen Production By Direct Thermolysis Of Water On Semipermeable Membrane", C.R. Acad. Sci. Paris. t. 292 pp. 1185–1190 (1981), report use of a single phase mixed conductor as an oxygen semipermeable membrane. A membrane of calcia stabilized zirconia at temperatures in a range of 1400° C. to 1800° C. is stated to extract oxygen from steam to produce hydrogen, and that oxygen was transported through the membrane.

U.S. Pat. No. 4,330,633 issued May 18, 1982, in the name of Yoshisato et al., describes a solid electrolyte said to selectively separate oxygen from a gaseous atmosphere having a high oxygen partial pressure into a gaseous atmosphere having a low oxygen partial pressure. Patentees describe the solid electrolytes as composed of a sintered body consisting essentially of an oxide of cobalt, an oxide of at least one metal selected from strontium and lanthanum, and an oxide of at least one metal selected from bismuth and cerium.

U.S. Pat. No. 4,659,448 issued Apr. 21, 1987, in the name of Gordon, describes a proces for removal of $SO_x$ and $NO_x$ from flue gases using a solid state electrochemical ceramic cell. Patentee states that the process requires application of an external electrical potential to electrocatalytically reduce $SO_x$ and $NO_x$ to elemental sulfur and free nitrogen gas. Oxygen apparently is removed through the solid electrolyte in what amounts to electrolysis.

U.S. Pat. No. 4,791,079 issued Dec. 13, 1988, in the name of Hazbun, describes a mixed ion and electron conducting catalytic ceramic membrane said to be useful in hydrocarbon oxidation or dehydrogenation processes. Patentee describes the membrane as consisting of two layers, one of which is an impervious mixed ion and electron conducting ceramic layer and the other is a porous catalyst-containing ion conducting ceramic layer. This impervious mixed ion and electron conducting ceramic membrane is further described at column 2, lines 57–62, as yttria stabilized zirconia which is doped with sufficient cerium oxide, $CeO_2$, or titanium oxide, $TiO_2$, to impart electron conducting characteristics to the ceramic.

Numerous publications describe conventional fuel cells which completely oxidize methane to carbon dioxide and water. Fuel cells are not designed to control partial oxidation processes which produce added-value products, but rather to generate electricity from fuel gas and air (or oxygen). Processes conducted in fuel cells are selected for complete oxidation of fuel to relatively valueless combustion products and require completion of an external electric circuit for oxidation of fuel gas to proceed. See, for example, U.S. Pat. No. 4,476,196 issued Oct. 9, 1984, in the name of Poeppel et al., U.S. Pat. No. 4,476,198 issued Oct. 9, 1984, in the name of Ackerman et al., or U.S. Pat. No. 4,883,497 issued Nov. 28, 1989, in the name of Claar et al.

U.S. Pat. No. 4,877,5063 issued Oct. 31, 1989, in the name of Fee et al., describes an electrically operated, solid electrolyte oxygen pump having a one-piece, monolithic ceramic structure said to afford high oxygen production per unit weight and volume and thus particularly adapted for use as a portable oxygen supply. Patentees describe the one-piece structure as comprised of thin ceramic layers of cell components including air electrodes, oxygen electrodes, electrolyte layers, and interconection materials. The oxygen pump is not designed to conduct chemical processes, but rather to remove oxygen from air to form a higher concentration of oxygen. The processes transferring oxygen across a solid electrolyte barrier in the oxygen pump require an external electric circuit including a source of electrical potential, DC voltage across the electrodes, for transfer to proceed.

European Patent Application 90305684.4, published on Nov. 28, 1990, under Publication No. EP 0 399 833 A1 in the name of Cable et al., describes an electrochemical reactor using solid membranes comprising; (1) a multi-phase mixture of an electronically-conductive material, (2) an oxygen ion-conductive material, and/or (3) a mixed metal oxide of a perovskite structure. Reactors are described in which oxygen from oxygen-containing gas is transported through a membrane disk to any gas that consumes oxygen. Flow of gases on each side of the membrane disk in the reactor shell shown are symmetrical flows across the disk, substantially radial outward from the center of the disk toward the wall of a cylindrical reactor shell. The gases on each side of the disk flow parallel to, and co-current with, each other.

SUMMARY OF THE INVENTION

In broad aspect, the invention is a cross-flow electrochemical reactor cell for reacting oxygen from an oxygen-containing gas stream with organic compounds in another gas stream which comprises either a hollow ceramic blade positioned across a gas stream flow or a stack of crossed hollow ceramic blades containing a channel or channels for flow of gas streams. Each channel has at least one channel wall disposed between a channel and a portion of an outer surface of the ceramic blade or a common wall with adjacent blades in a stack comprising a gas-impervious mixed metal oxide material of a perovskite structure having electron conductivity and oxygen ion conductivity. The invention includes reactors comprising first and second zones seprated by gas-impervious mixed metal oxide material having electron conductivity and oxygen ion conductivity. Prefered gas-impervious materials comprise at least one mixed metal oxide having a perovskite structure or perovskite-like structure. Also, the invention includes oxidation processes controlled by using these electrochemical reactors. Oxidation reactions conducted in cross-flow reactors according to this invention do not require an external source of electrical potential or any external electric circuit for oxidation to proceed.

In one aspect, the invention is an electrochemical reactor cell for reacting oxygen from an oxygen-containing gas stream with organic compounds in another gas stream. A reactor cell comprises a first gas stream defining a direction of steam flow containing either the oxygen-containing gas or the organic compounds and positioned therein a ceramic core having an outer surface including a generally flat entrance surface and a generally flat exit surface spaced apart from and substantially parallel to the entrance surface, and at least one core channel therebetween for flow of one or more gases from the entrance surface to the exit surface and defining a direction of channel flow. The direction of channel flow is non parallel to the direction of stream flow. Preferably the direction of stream flow and the direction of channel flow are transverse to one another. Each channel has at least one channel wall disposed between the channel and a portion of the outer surface of the ceramic core comprising a gas-impervious mixed metal oxide material of a perovskite structure having electron conductivity and oxygen ion conductivity.

In a preferred embodiment of the invention, the mixed metal oxide material of a perovskite structure comprises a combination of metals selected from the group consisting of chemical elements having atomic numbers 4, 12, 20 to 31, 38 to 41, and 56 to 71 inclusive.

In another aspect, the invention is an electrochemical reactor for reacting oxygen from an oxygen-containing gas stream with organic compounds in another gas stream which comprises a vessel having an entrance port, an exit port, and a passageway therebetween for stream flow of one or more gases from the entrance port to the exit port defining a direction of stream flow, and at least one electrochemical reactor cell positioned within the vessel. Typically, the electrochemical reactor cell also comprises an entrance manifold means in flow communication with the channel or channels at the entrance surface of at least one ceramic core and an exit manifold means in flow communication with the same channel or channels at one or more exit surface and thereby in flow communication with entrance manifold means. The vessel and the electrochemical reactor cell together form a first zone for introducing, reacting at least one compound therein and expelling a first gas or gas mixture and wherein the entrance manifold means, the core channel or channels and the exit manifold means form a second zone within the electrochemical reactor for introducing, reacting at least one compound therein and expelling a second gas or gas mixture.

In another aspect, the invention is an electrochemical reactor cell for reacting oxygen from an oxygen-containing gas stream with organic compounds in another gas stream, comprising a ceramic core having a generally flat first. entrance surface, a generally flat first exit surface spaced apart from and substantially parallel to the first entrance surface, and a first plurality of core channels therebetween for flow of an oxygen-containing gas stream from the first entrance surface to the first exit surface operable to define a first direction of channel flow, and having a generally flat second entrance surface, a generally flat second exit surface spaced apart from and substantially parallel to the second entrance surface, and a plurality of core channels therebetween for flow of the other gas stream containing a least one organic compound from the second entrance surface to the second exit surface operable to define a second direction of channel flow which direction is non parallel to the first direction of channel flow. Preferably the first direction of channel flow and the second direction of channel flow are transverse to one another. Each channel has a portion of channel wall disposed between the oxygen-containing gas stream and the another gas stream comprising a gas-impervious mixed metal oxide material of a perovskite structure having electron conductivity and oxygen ion conductivity. Preferably each channel of the first plurality of core channels comprises at least one wall which is generally planar and disposed parallel to the first direction of channel flow and each channel of the second plurality of core channels comprises at least one wall which is generally planar and disposed parallel to the second direction of channel flow, and wherein the first plurality of core channels and the second plurality of core channels are disposed transverse to one another.

In yet another aspect, the invention is an electrochemical reactor comprising at least one electrochemical reactor cell with a stacked ceramic core as described above. The cell further comprises a first entrance manifold means in flow communication with first plurality of core channels at the first entrance surface and a first exit manifold means in flow communication with the same channels at the first exit surface, thereby in flow communication with first entrance manifold means, and a second entrance manifold means in flow communication with second plurality of core channels at the second entrance surface and a second exit manifold means in flow communication with the same channels at the second exit surface, thereby in flow communication with second entrance manifold means. In this embodiment of the invention the first entrance manifold means, plurality of core channels and exit manifold means together form a first zone for introducing, reacting at least one compound therein and expelling a first gas or gas mixture and the second entrance manifold means, plurality of core channels and exit manifold means together form a second zone for introducing, reacting at least one compound therein and expelling a second gas or gas mixture. In a preferred embodiment of the invention, the mixed metal oxide material of a perovskite structure is made by a process which comprises the steps of (A) forming an intimate multi-phase mixture of an aqueous and/or organic liquid having a low normal boiling point temperature and selected solid compounds which are precursors of the gas-impervious mixed metal oxide material of a perovskite structure having electron conductivity and oxygen ion conductivity. Precursor compounds are selected from a first group consisting of acetates, carbonates, nitrates and oxides of elements having atomic numbers 12, 20, 38, 39, and 56 to 71 inclusive and selected from a second group consisting of acetates, carbonates, nitrates and oxides of elements having atomic numbers 21 to 30, (B) calcining the mixture to temperatures in a range upward from about 500° C. to form the desired ceramic material, (C) crushing the ceramic material to form a ceramic powder, (D) forming an intimate multi-phase mixture of an aqueous and/or organic liquid having a low normal boiling point temperature, the ceramic powder, and additives selected from the group consisting of binders, dispersants, plasticizers, combinations thereof, (E) forming the mixture into a desired shape, and (F) sintering the formed mixture to temperatures in a range upward front at least about 450° C., preferably upward from about 800° C., to form a dense, solid and gas-impervious mixed metal oxide material of a perovskite structure having electron conductivity and oxygen ion conductivity.

In another aspect, the invention is an electrochemical process for partial oxidation of at least one organic compound in a gas stream with oxygen from another gas stream which comprises the steps of (A) providing at least one electrochemical reactor described above;

(B) controlling temperatures within the electrochemical reactor to temperatures in a range from about 400° C. to about 1400° C., (C) introducing an oxygen-containing gas stream into either the first or second zone, reacting and transferring oxygen through the ceramic into the other zone, and expelling a residue of the oxygen-containing gas stream, and (D) introducing a gas stream containing an organic compound or compounds into the other zone, reacting at least one of the compounds with the oxygen transferred into the zone to form partial oxidation products, and expelling a product-containing gas mixture.

In another preferred embodiment of a process according the invention the partial oxidation is of at least one organic compound selected from the group consisting of methane, ethane, and other light hydrocarbon gases carried out at temperatures within the electrochemical reactor in a range from about 1000° C. to about 1400° C. Typically, this process includes a step (E) recovering from the product-containing gas mixture a synthesis gas comprising hydrogen and carbon monoxide.

In another preferred embodiment of a process according to the invention the partial oxidation is of at least one organic compound selected from the group consisting of methane, ethane, and other light hydrocarbon gases carried out at temperatures within the electrochemical reactor in a range from about 575° C. to about 975° C. Typically, this process includes a step (E) recovering from the product-containing gas mixture one or more unsaturated hydrocarbon compounds.

In still another preferred embodiment of a process according the invention the partial oxidation of at least one organic compound selected from the group consisting of methane, ethane, and other light hydrocarbon gases is carried out in the presence of a catalyst at temperatures within the electrochemical reactor in a range from about 450° C. to about 1250° C., and the process further comprising (E) recovering from the product-containing gas mixture a synthesis gas comprising hydrogen and carbon monoxide

BRIEF DESCRIPTION OF THE DRAWINGS

The appended claims set forth those novel features which characterize the present invention. The present invention itself, as well as advantages thereof, may best be understood, however, by reference to the following brief description of preferred embodiments taken in conjunction with the annexed drawings, in which:

BRIEF DESCRIPTION OF THE INVENTION

Figure 1:
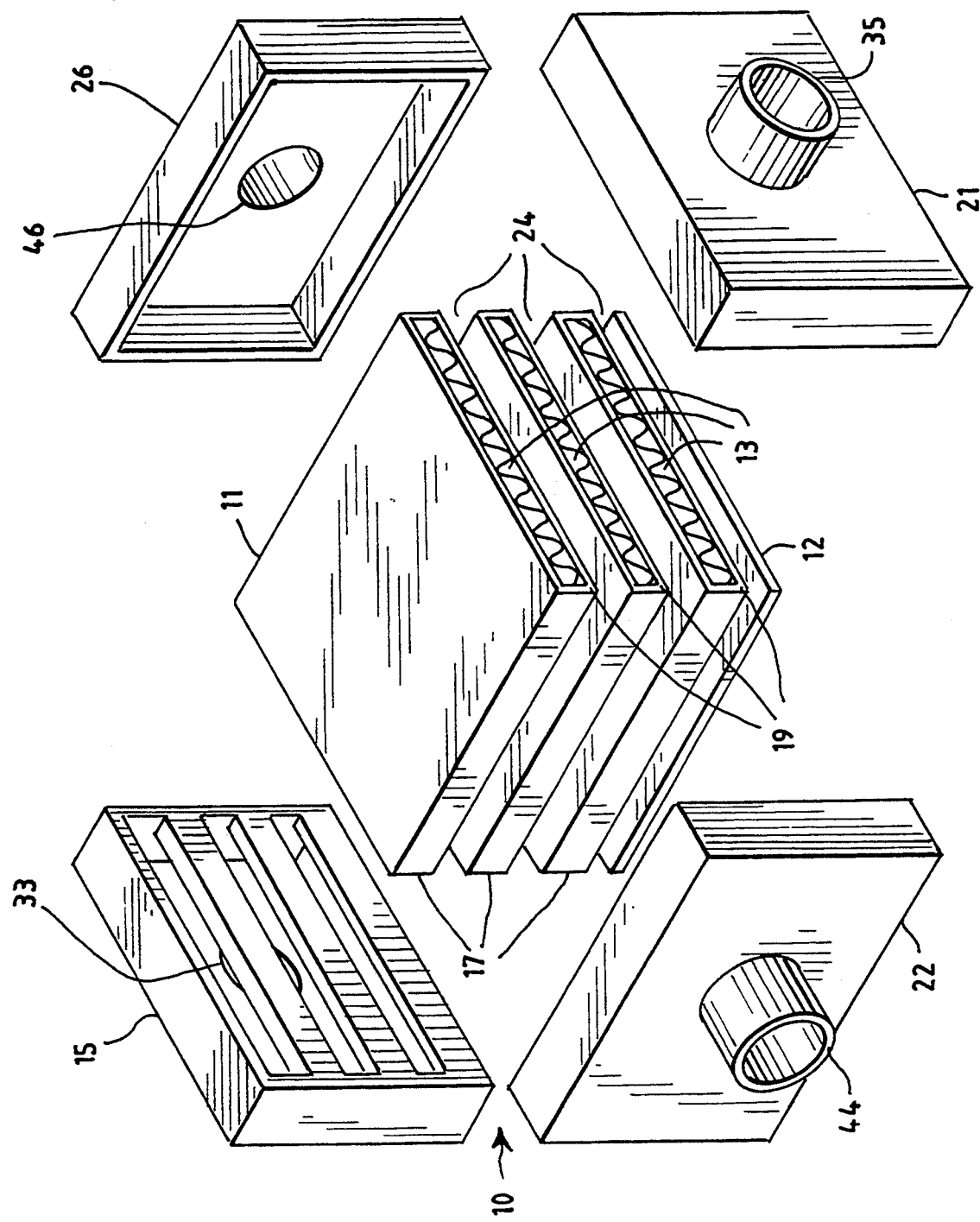
FIG. 1 is an exploded perspective view of one embodiment of a cross-flow reactor in accordance with the present invention.
Figure 2:
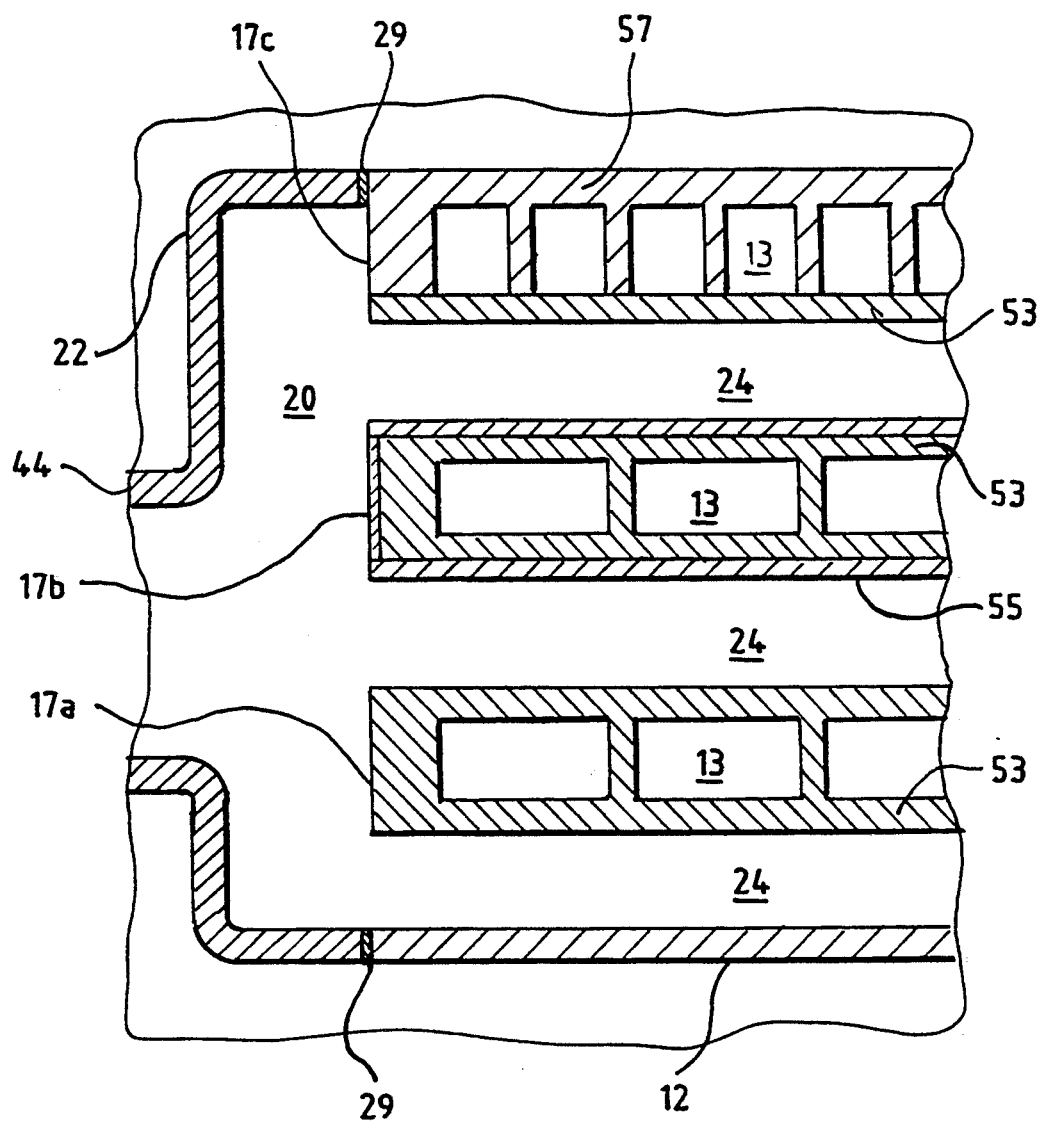
FIG. 2 is a sectional view of the cross-flow reactor of FIG. 1.

FIGS. 1 and 2 illustrate a cross-flow reactor 10 having an array of reactor cells 11. Three reactor cell cores 17 are positioned across passageways for flow of a gas steam 24. Each reactor cell core 17 has opposite top and bottom outer surfaces which are generally flat and approximately 90° form an entrance surface and an opposite side exit surface spaced apart from and substantially parallel with each other. The array of reactor cells together is approximately a rectangular parallelepiped shape. Reactor cell cores 17 have a plurality of core channels 13 between their entrance surfaces and exit surfaces 19 for flow of gases from each entrance surface to the corresponding opposite exit surface and defining a direction of channel flow which is rotated approximately 90° form the entrance and exit surfaces and is approximately 90° form the direction of stream flow along the top and/or bottom outer surface of each core. Structures 15 and 21 adjacent opposite entrance and exit surfaces of reactor cell cores 17 define spaced entrance and exit manifolds (not shown) that communicate with one another via channels 13 formed in the cores. Further, structures 22 and 26 adjacent opposite edge surfaces of reactor cell cores 17 define spaced entrance manifold 20 and opposite exit manifold (not shown) that communicate with one another via passageways 24 formed by spaces between outer surfaces of the reactor cell cores and bottom structure 12. An inlet line 33 in structure 15 is adapted to carry either an oxygen-containing gas stream or another gas stream containing reactants comprising one or more organic compounds to the entrance manifold for flow through channels 13, and an outlet line 35 in structure 21 is adapted to carry a residue of the oxygen-containing gas stream or all remaining gas, unconsumed reactants, and product-containing gas mixture from the exit manifold. Likewise, inlet line 44 in structure 22 is adapted to carry either an oxygen-containing gas stream or another gas stream containing reactants comprising one or more organic compounds to the entrance manifold for flow through passageways 24, and an outlet line 46 in structure 26 is adapted to carry a residue of the oxygen-containing gas stream or all remaining gas, unconsumed reactants, and product-containing gas mixture from the exit manifold. Passageways 24 and channels 13 are disposed transverse to one another, so that the respective inlet and outlet manifolds for oxygen-containing gas stream and for the another gas stream containing reactants are located alternately adjacent one another.

FIG. 2 illustrates an enlarged cross section of the array of reactor cells 11 for cross-flow reactor 10 of FIG. 1. Specifically, passageways 24 for flow a one gas stream are illustrated to extend in the plane of the viewing paper and are formed by spaces between outer surfaces of the reactor cell cores and bottom structure 12 defining the exposed walls of the passageways 24; while the channels 13 for the other gas stream are illustrated to extend normal to the viewing paper and are formed in an oxygen permeable material 53 which has both electron conductivity and oxygen ion conductivity defining the exposed walls of the channels 23.

For economy of illustration different embodiments of reactor cell cores 17 are shown in FIG. 2. Core structure 17a has channels 13 formed with a rectangular cross-section in an oxygen permeable material 53 which has both electron conductivity and oxygen ion conductivity. In core structure 17b oxygen permeable material 53 is enclosed in a layer of gas permeable catalyst 55. Core structure 17c has channels 13 formed by an inert gas impermeable support 57 and a wall of an oxygen permeable material 53 which has both electron conductivity and oxygen ion conductivity. The array of reactor cells 11, bottom structure 12, and manifold structures 15, 21, 22, and 26 are snugged or otherwise connected together and may be fit within a housing (not shown) and/or have insulation surrounding these components. Also, the annular space between the top core, bottom structure, and separate manifold structures can be packed or filled as at 29 with a ceramic paste or the like seal to minimize leakage of gases between the manifolds.

Figure 3:
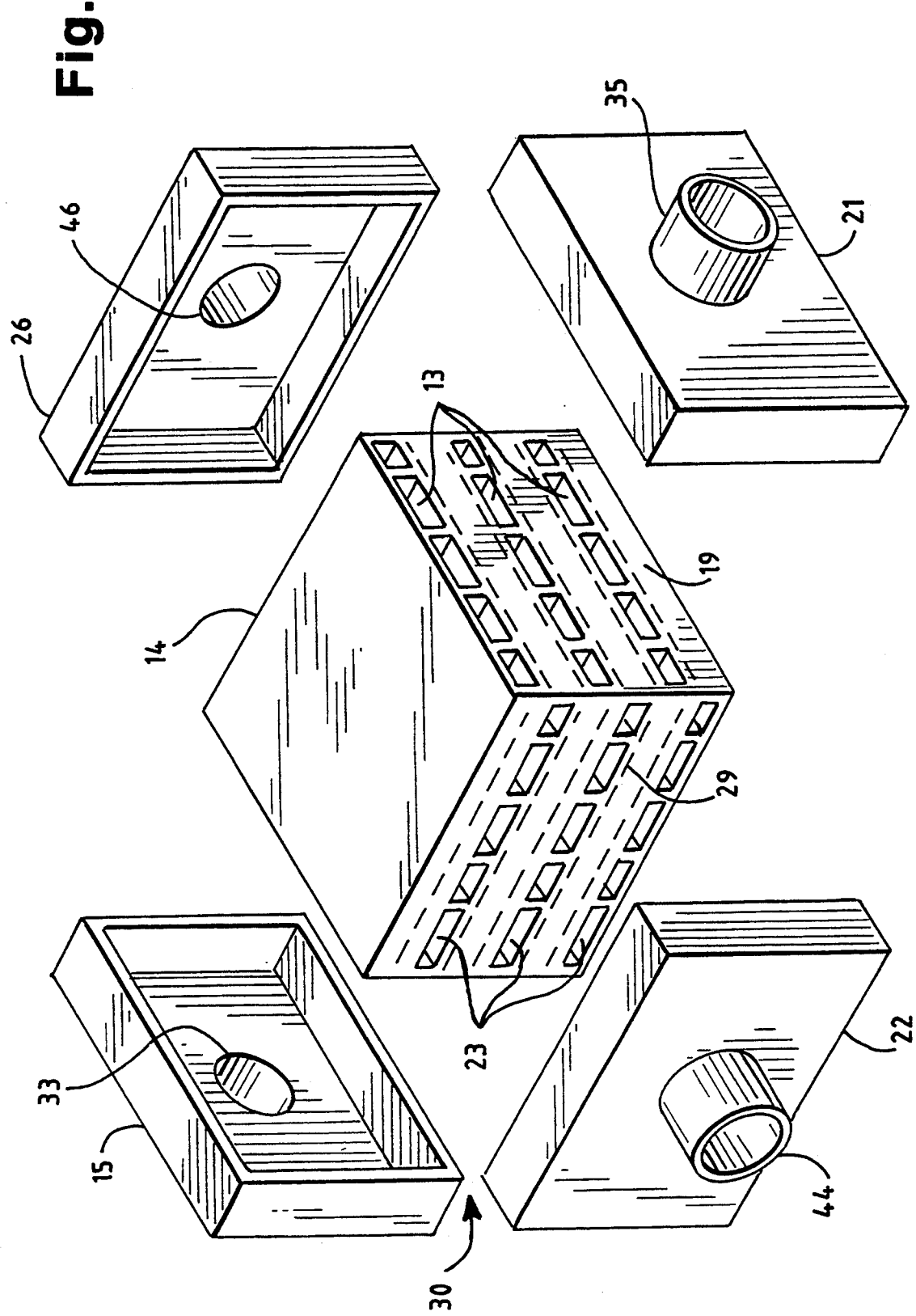
FIG. 3 is an exploded perspective view of another embodiment of a cross-flow reactor in accordance with the present invention.

FIG. 3 illustrates a cross-flow reactor 30 having a core of reactor cells 14 of monolithic construction. The monolithic core of reactor cells is approximately a rectangular parallelepiped shape having two sets of entrance and opposite side exit surfaces, each set spaced apart from and substantially parallel with each other, and top and bottom outer surfaces which are generally flat and approximately 90° form the entrance and exit surfaces. Structures 15 and 21 adjacent opposite entrance surface (not shown) and exit surface 19 of reactor cell core define spaced entrance and exit manifolds (not shown) that communicate with one another via channels 13 formed in the core. Further, structures 22 and 26 adjacent opposite entrance surface 29 and exit surface (not shown) of reactor cell core define spaced entrance and exit manifolds (not shown) that communicate with one another via channels 23 formed in the core. An inlet line 33 in structure 15 is adapted to carry either an oxygen-containing gas stream or another gas stream containing reactants comprising one or more organic compounds to the entrance manifold for flow through channels 13, and an outlet line 35 in structure 21 is adapted to carry a residue of the oxygen-containing gas stream or all remaining gas, unconsumed reactants, and product-containing gas mixture from the exit manifold. Likewise, inlet line 44 in structure 22 is adapted to carry either an oxygen-containing gas stream or another gas stream containing reactants comprising one or more organic compounds to the entrance manifold for flow through channels 23, and an outlet line 46 in structure 26 is adapted to carry a residue of the oxygen-containing gas stream or all remaining gas, unconsumed reactants, and product-containing gas mixture from the exit manifold. Channels 13 and channels 23 are disposed transverse to one another, so that the respective inlet and outlet manifolds for oxygen-containing gas stream and for the another gas stream containing reactants are located alternately adjacent one another. The core of reactor cells 14 and manifold structures 15, 21, 22, and 26 are snugged or otherwise connected together and may be fit within a housing (not shown) and/or have insulation surrounding these components. Also, the annular space between the top core, bottom structure, and separate manifold structures can be packed or filled with a ceramic paste or the like seal to minimize leakage of gases between the manifolds.

Figure 4:
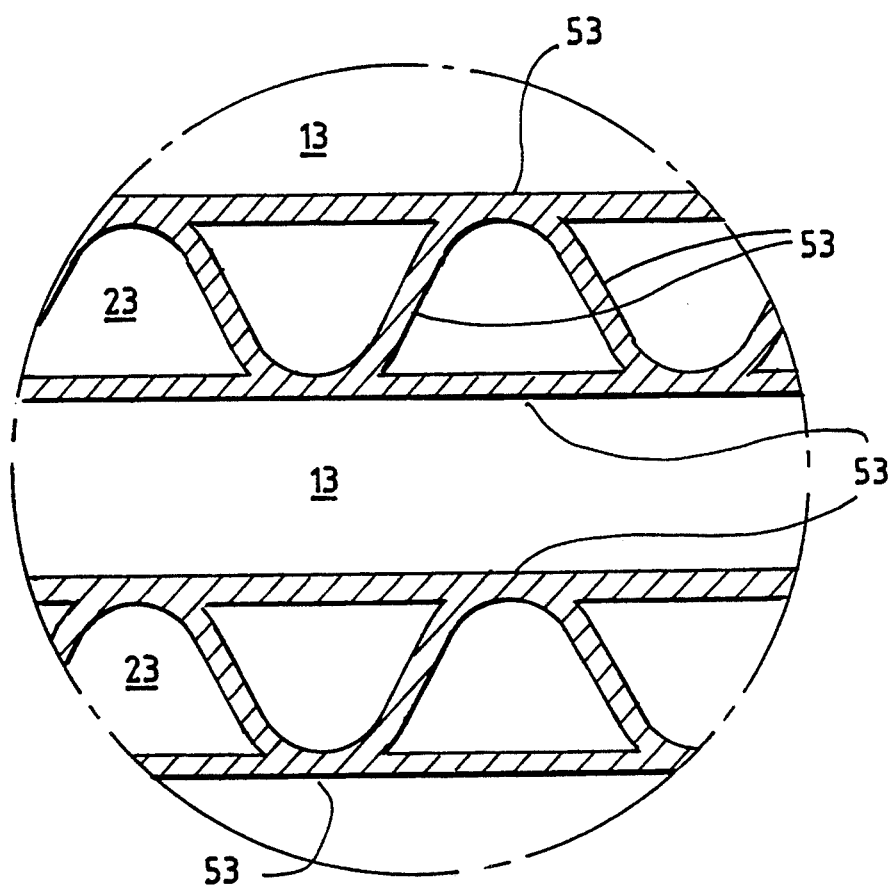
FIG. 4 is a sectional view of a cross-flow core in accordance with the present invention.

FIG. 4 illustrates an enlarged cross section of the core of reactor cells 14 for cross-flow reactor 30 of FIG. 3. Specifically, channels 13 for flow a one gas stream are illustrated to extend in the plane of the viewing paper and are formed in an oxygen permeable material 53 which has both electron conductivity and oxygen ion conductivity defining the exposed walls of the channels 13; while the channels 23 for the other gas stream are illustrated to extend normal to the viewing paper and are formed in an oxygen permeable material 53 which has both electron conductivity and oxygen ion conductivity defining the exposed walls of the channels 23.

It will be appreciated that in cross-flow reactor 10 having an array of reactor cells 11, the passageways 24 and channels 13 are laid out in a crosswise pattern so that the two gas streams flow transverse to one another, and in cross-flow reactor 30 having a monolithic core of reactor cells 11, the channels 23 and channels 13 are laid out in a crosswise pattern so that the two gas streams flow transverse to one another. These cross flow arrangements allow for direct and efficient manifolding of the opposite open ends of the flow channels and/or passageways, and the manifolds can be extended over almost the entire opposite entrance and exit surfaces or edges of the cores.

The gas-impervious mixed metal oxide materials useful in ceramic cores of this invention include any single phase and/or multi-phase, dense phase, intimate mixture of materials which together form a solid material having electron conductivity and oxygen ion conductivity. As used herein, the term "gas-impervious" means "substantially gas-impervious or gas-tight" in that the material does not permit a substantial amount of oxygen-containing gas stream or another, organic-containing, gas stream to pass through the solid mixed metal oxide materials of the ceramic cores as a gas (i.e., the solid mixed metal oxide materials are non-porous, rather than porous, with respect to the relevant gases). A minor degree of porosity to gases might, in some systems, be unavoidable and/or acceptable, such as when hydrogen gas is present.

In particular, it has been found that mixed metal oxides having a perovskite structure (at operating temperatures) can have useful levels of oxygen ion conductivity. Materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions at the corners of the cell, another metal ion in its center and oxygen ions at the midpoints of each cube edge. This cubic lattice is identified as an $ABO_3$-type structure where A and B represent metal ions.

In the idealized form of perovskite structures, generally, it is required that the sum of the valences of A ions and B ions equal 6, as in the model perovskite mineral, $CaTiO_3$. A relationship between radii of ions in an $ABO_3$-type structure containing two metal ions is expressed by the formula $$r_A + r_X = \tau \cdot (r_B + r_X) \cdot (2)^{0.5} \qquad \text{I}$$

where $r_A$, $r_B$, and $r_X$ are, respectively, radii of A ions, B ions and oxygen ions and $\tau$ is a factor having values in a range from about 0.7 to about 1.0. Typically, compounds with the perovskite structure have A ions with radii of between about 1.0 to about 1.4 Angstrom and B ions with radii of between about 0.45 to about 0.75 Angstrom. It appears, generally, that when mixed metal oxides of the perovskite structure contain A ions with radii approaching the low end of their range for a specific B ion as given by formula I above, then conductivity of oxygen ions generally increases. This trend toward increased conductivity of oxygen ions may be limited, however, by lowered stability of the perovskite structures at operating temperatures for A ions with radii approaching the low end of their range for a specific B ion.

A variety of selected chemical elements and compounds of selected elements, such as acetates, carbonates, chlorides, oxides, nitrates, etc., may be used to form perovskites useful in the present invention. Generally, any combination of metallic elements satisfying requirements of a perovskite may be used. Examples of useful chemical elements include beryllium (Be, Atomic No. 4), magnesium (Mg, Atomic No. 12), calcium (Ca, Atomic No. 20), scandium (Sc, Atomic No. 21), titanium (Ti, Atomic No. 22), vanadium (V, Atomic No. 23), chromium (Cr, Atomic No. 24), manganese (Mn, Atomic No. 25), iron (Fe, Atomic No. 26), cobalt (Co, Atomic No. 27), nickel (Ni, Atomic No. 28), copper (Cu, Atomic No. 29), zinc (Zn, Atomic No. 30), gallium (Ga, Atomic No. 31), strontium (Sr, Atomic No. 38), yttrium (Y, Atomic No. 39), zirconium (Zr, Atomic No. 40), niobium (Nb, Atomic No. 41), barium (Ba, Atomic No. 56), lanthanum (La, Atomic No. 57), cerium (Ce, Atomic No. 58), praseodymium (Pr, Atomic No. 59), neodymium (Nd, Atomic No. 60), promethium (Pm, Atomic No. 61), samarium (Sm, Atomic No. 62), europium (Eu, Atomic No. 63), gadolinium (Gd, Atomic No. 64), terbium (Tb, Atomic No. 65), dysprosium (Dy, Atomic No. 66), holmium (Ho, Atomic No. 67), erbium (Er, Atomic No. 68), thulium (Tm, Atomic No. 69), ytterbium (Yb, Atomic No. 70), lutetium (Lu, Atomic No. 71), and mixtures thereof.

Preferred A metal ions in the $ABO_3$-type structure materials useful in the present invention include ions of the lanthanide series of elements in the Periodic Table of Elements (Atomic Nos. 57 to 71 inclusive), yttrium ions (Atomic No. 39), and ions of the Group IIA elements in the Periodic Table of Elements, particularly magnesium ions (Atomic No. 12), calcium ions (Atomic No. 20), strontium ions (Atomic No. 38) and barium ions (Atomic No. 56).

Preferred B metal ions in the $ABO_3$-type structure materials useful in the present invention include ions of the first row of transition elements in the Periodic Table of Elements, i.e., scandium ions (Atomic No. 21), titanium ions (Atomic No. 22), vanadium ions (Atomic No. 23), chromium ions (Atomic No. 24), manganese ions (Atomic No. 25), iron ions (Atomic No. 26), cobalt ions (Atomic No. 27), nickel ions (Atomic No. 28), copper ions (Atomic No. 29), and zinc ions (Atomic No. 30). Among these ions, cobalt ions and iron ions are more preferred.

A wide variety of multiple cation substitutions on both the A and B sites are stable in the perovskite structure. Likewise, a variety of more complex perovskite compounds containing a mixture of A metal ions and B metal ions are useful in this invention. Preferred for use in the present invention are materials having a perovskite structure containing metal ions of more than two elements (in addition to oxygen).

Examples of mixed metal oxides having a perovskite structure which are useful as solid oxygen ion-conductive ceramics in the present invention include lanthanum-strontium-cobaltite, lanthanum-calcium-cobaltite, lanthanum-strontium-ferrtite, strontium-ferrtite, strontium-cobaltite, gadolinium-strontium-cobaltite, etc., and mixtures thereof. Specific examples included are $La_aSr_bCoO_3$, $La_aCa_bCoO_3$, $La_aSr_bFeO_3$, $SrCo_aFe_bO_3$, $Gd_aSr_bCoO_3$, etc., were a and b are numbers, the sum of which is in a range from about 1 to about 1.5. Molar ration between the respective metals represented by the ration a:b may range widely, e.g., 4:1, 3:1, 1:1, 1:4, 1:3, etc. Particularly preferred are materials represented by $SrCo_{0.5}Fe_{0.5}O_x$, $SrCo_{0.5}FeO_x$, $SrCo_{0.8}Fe_{0.2}O_x$, and $La_{0.2}Sr_{0.8}Co_{0.4}Fe_{0.6}O_x$ and having an X-ray identifiable perovskite crystalline phase.

Useful materials having the $ABO_3$-type structure and how to make them are described in U. Balachandran et al., "Fabrication of Ceramic-Membrane Tubes for Direct Conversion of Natural Gas", submitted for publication in the Proceedings of the 1992 International Gas Research Conference (IGRC92), Orlando, Fla., (Nov. 16-19, 1992); P. D. Battle et al., J. Solid State Chem., 76, 334 (1988); Y. Takeda et al., Z. Anorg. Allg. Chem., 550/541, 259 (1986); Y. Teraoka et al., Chem. Lett., 19, 1743 (1985); M. Harder and H. H. Muller-Buschbaum, Z. Anorg. Allg. Chem., 464, 169 (1980); C. Greaves et al., Acta Cryst., B31, 1131, 641 (1975). Each of these publications is hereby incorporated herein by reference for its disclosure relating to perovskites.

As mentioned above, the gas-impervious mixed metal oxide materials useful in ceramic cores of this invention include any single phase and/or multi-phase, dense phase, intimate mixture of materials which has electron conductivity and oxygen ion conductivity. In relation to the solid metal oxide materials, the terms "mixture" and "mixtures" include materials comprised of two or more solid phases, and single-phase materials in which atoms of the included elements are intermingled in the same solid phase, such as in the yttria-stabilized zirconia. The term "multi-phase" refers to a material which contains two or more solid phases interspersed without forming a single phase solution. Useful core material, therefore, includes the multi-phase mixture which is "multi-phase" because the electronically-conductive material and the oxygen ion-conductive material are present as at least two solid phases, such that atoms of the various components of the multicomponent solid are, primarily, not intermingled in the same solid phase.

Useful multi-phase solid core materials are described in European Patent Application number; 90305684.4, published on Nov. 28, 1990, under Publication No. EP 0 399 833 A1 the disclosure of which is hereby incorporated herein by reference.

In the indirect method for making a ceramic core containing a mixed metal oxide material having a perovskite structure, a solid perovskite is made and comuted to a powder, the powder is blended into a plastic mass with solvent liquid and optionally additives, a desired shape formed from the plastic mass, and the shape heated to temperatures suffucient to form a dense and solid ceramic having electron conductivity and oxygen ion conductivity. Typically, such ceramics are obtained at temperatures in a range upward from about 500° C., and generally at temperatures in a range upward from about 800° C.

A variety of methods may be used to prepare perovskite powder for preparation of such ceramic cores. Suitable methods include prepartation from oxides and/or thermal decomposition of precursor compounds selected from a group consisting of acetates, carbonates, nitrates of the above-described metal A and B ions.

Examples of useful precursor compounds include; beryllium acetate, beryllium oxide, magnesium acetate, magnesium carbonate, magnesium chloride, magnesium nitrate, magnesium oxide, calcium acetate, calcium carbonate, calcium chloride, calcium nitrate, calcium oxide, scandium acetate, scandium chloride, scandium nitrate, scandium oxide, titanium chloride, titanium oxide, vanadium chloride, vanadium oxide, chromium acetate, chromium chloride, chromium nitrate, chromium oxide, manganese acetate, manganese carbonate, manganese chloride, manganese nitrate, manganese oxide, iron acetate, iron chloride, iron nitrate, iron oxide, cobalt acetate, cobalt carbonate, cobalt chloride, cobalt nitrate, cobalt oxide, nickel acetate, nickel carbonate, nickel chloride, nickel nitrate, nickel oxide, copper acetate, copper carbonate, copper chloride, copper nitrate, copper oxide, zinc acetate, zinc chloride, zinc nitrate, zinc oxide, gallium chloride, gallium nitrate, gallium oxide, strontium carbonate, strontium chloride, strontium nitrate, yttrium acetate, yttrium carbonate, yttrium chloride, yttrium nitrate, yttrium oxide, zirconium chloride, zirconium oxide, niobium chloride, niobium oxide, barium acetate, barium carbonate, barium chloride, barium nitrate, barium oxide, lanthanum acetate, lanthanum carbonate, lanthanum chloride, lanthanum nitrate, lanthanum oxide, cerium acetate, cerium carbonate, cerium chloride, cerium nitrate, cerium oxide, praseodymium acetate, praseodymium chloride, praseodymium nitrate, praseodymium oxide, neodymium acetate, neodymium chloride, neodymium nitrate, neodymium oxide, samarium acetate, samarium chloride, samarium nitrate, samarium oxide, europium acetate, europium carbonate, europium chloride, europium nitrate, europium oxide, gadolinium acetate, gadolinium chloride, gadolinium nitrate, gadolinium oxide, terbium acetate, terbium carbonate, terbiumm chloride, terbium nitrate, terbium oxide, dysprosium acetate, dysprosium chloride, dysprosium nitrate, dysprosium oxide, holmium carbonate, holmium chloride, holmium nitrate, holmium oxide, erbium acetate, erbium carbonate, erbium chloride, erbium nitrate, erbium oxide, thulium acetate, thulium carbonate, thulium chloride, thulium nitrate, thulium oxide, ytterbium acetate, ytterbium chloride, ytterbium nitrate, ytterbium oxide, lutetium acetate, lutetium chloride, lutetium oxide, and mixtures thereof.

As one example, the mixed metal oxide material of a perovskite structure is made by a process which comprises the steps of (A) forming an intimate multi-phase mixture of an aqueous and/or organic liquid having a low normal boiling point temperature and selected solid compounds which are precursors of the gas-impervious mixed metal oxide material of a perovskite structure having electron conductivity and oxygen ion conductivity the precursor compounds selected from a first group consisting of acetates, carbonates, nitrates and oxides of elements having atomic numbers 12, 20, 38, 39, and 56 to 71 inclusive and precursor compounds selected from a second group consisting of acetates, carbonates, nitrates and oxides of elements having atomic numbers 21 to 30, (B) calcining the mixture to temperatures in a range upward from about 500° C. to form the desired ceramic material, (C) crushing the ceramic material to form a ceramic powder, (D) forming an intimate multi-phase mixture of an aqueous and/or organic liquid having a low normal boiling point temperature, the ceramic powder, and additives selected from the group consisting of binders, dispersants, plasticizers, and combinations thereof, (E) forming the mixture into a desired shape, and (F) sintering the formed mixture to temperatures in a range upward from about 800° C. to form a dense, solid and gas-impervious mixed metal oxide material of a perovskite structure having electron conductivity and oxygen ion conductivity.

In the above processes for making powders and cores the water and/or organic liquids having a low normal boiling point temperature include polar organic solvents having normal boiling point temperatures in a range downward from about 250° C., preferably downward from about 100° C., such as alcohols and chlorinated hydrocarbons.

Advantageously, in the above processes for making ceramic cores additives selected from the group consisting of binders, dispersants, plasticizers, and combinations thereof are added to the mixture prior to forming the mixture into a desired shape. Such additive agents are preferably materials which do not interfere with formation of a dense and solid core in the final step of sintering the formed mixture and the one or more additives used are capable of being easily dispersed in the mixture. Such additives are known and commercially available.

Additional formation and/or modification of perovskite structure may occur under conditions of reaction in the reactor cell comprising the mixed metal oxides of perovskite structure.

Any method of ceramic core fabrication suitable to the desired embodiment can be employed. Suitable adaptations of methods for formation of ceramic solid oxide fuel cells and/or monolithic solid ceramic electrolyte oxygen pumps may be used, i.e., omiting provision for use of an external source of electrical potential or any external electric circuit. Advantageously, a hollow ceramic blade may be formed by extrusion of a plastic materials which are subsequently fired. A process for fabricating ceramic materials for use in cross-flow cells may include the steps of forming the appropriate materials into corrugated structures to provide gas flow channels, and layering, bonding, and co-firing the flat and corrugated cell components together to form a monolitic cell. Arrangements for fabrication of a monolithic ceramic core and/or cell array are disclosed, for example, in U.S. Pat. No. 4,883,497 to Claar et al and U.S. Pat. No. 4,877,506 to Fee et al. Each of these references is hereby incorporated by reference for their disclosure relating to ceramic core fabrications. Selection and use of such methods of fabrication is well within the ability of one of ordinary skill to obtain a desired shape without undue experimentation.

Advantageously, in the above processes for making ceramic cores additives selected from the group consisting of binders, dispersants, plasticizers, and combinations thereof are added to the mixture prior to forming the mixture into a desired shape. Such additive agents are preferably materials which do not interfere with formation of a dense and solid core in the final step of sintering the formed mixture and the one or more additives used are capable of being easily dispersed in the mixture. Selection and use of such commercially available additives is well within the ability of one of ordinary skill to obtain a desired shape without undue experimentation.

Suitable catalysts for processes according to this invention in which synthesis gas is made from methane, ethane, and other light hydrocarbon gases include commercial catalysts for steam reforming of methane and other hydrocarbons. Advantageously, catalyst compositions useful for the production of synthesis gas are resistant to coke formation when used to catalyze the reaction of a hydrocarbyl compound with oxygen from an oxygen-containing gas at elevated temperatures to form synthesis gas.

Vernon et al. in *Catalysis Letters*, 6, pp. 181–186, (1990), discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. Ashcroft et al. in *Nature*, 352, p. 225, (1991), describes steam reforming of methane with carbon dioxide to form synthesis gas using catalysts such as palladium, ruthenium and iridium on alumina, as well as nickel on alumina. U.S. Pat. No. 3,791,993 to Rostrup-Nielsen discloses the preparation of catalysts for reforming gaseous or vaporizable liquid hydrocarbons using steam, carbon oxide, oxygen and/or air. Examples in U.S. Pat. No. 3,791,993 show that compositions having nickel, magnesium and aluminum are suitable for converting naphtha to hydrogen-rich gaseous products using steam reforming. Each of these references is hereby incorporated by reference for their disclosure relating to reforming catalysts.

Catalysts useful in processes of this invention in which synthesis gas is made are, advantageously, prepared from a metal-containing catalyst precursor compound having a structure that is referred to as "hydrotalcite-like." Hydrotalcite-like compounds are anionic clays, both natural and synthetic, that have a layered or sheet-like structure. For example, hydrotalcite, a naturally occurring mineral, has the chemical composition $$[Mg_6Al_2(OH)_{16}]CO_3.4\ H_2O,$$

and is composed of molecular "sheets", each sheet comprising a mixture of magnesium and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula for these hydrotalcite-like compounds is:

$$[M^{2+}{}_{(1-x)}M^{3+}{}_x(OH)_2]^{x+}(A_{x/n}{}^{n-}).mH_2O$$

wherein x generally is a number between 0.1 and 0.50, $M^{2+}$ is a 2+ metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in *Inorganic Chemistry*, 31, p. 3869, (1992). Drezdzon, in *Inorganic Chemistry*, 27, p. 4628, (1988), discloses the synthesis of isopolymetalate-pillared hydrotalcites. Each of these references is hereby incorporated by reference for their disclosure relating to hydrotalcite-like catalysts.

Commonly assigned U.S. patent application Ser. No. 07/745,902, filed on Aug. 16, 1991, to Bhattacharyya et al., also discloses the preparation of hydrotalcite-like compounds and specification of this copending application is hereby specifically incorporated by reference.

Preferred catalysts for processes according to this invention in which synthesis gas is made from methane, ethane, and other light hydrocarbon gases include catalysts based on hydrotalcite-like compounds containing at least one metals selected from transition elements in the Periodic Table of the Elements, particularly where catalyst temperatures within the electrochemical reactor are in a range from about 450° C. to about 1250° C.

Other preferred embodiments include methods for preparing synthesis gas using nickel catalysts disclosed in commonly assigned U.S. patent application Ser. No. 07/993,419, filed on Dec. 21, 1992, in the name of Bhattacharyya et al., the specification of this copending application is hereby specifically incorporated by reference.

The gas-impervious mixed metal oxide material of a perovskite structure of the ceramic core in electrochemical reactor cells according to this invention may, advantageously, comprises an inert support. An inert support may be any material which achieves the desired objective as long as it does not interfere with reaction processes under reaction conditions. For example, a wall of gas-impervious mixed metal oxide material of a perovskite structure may be supported on a porous or gas-impervious solid having a comb-like cross section. In another example, gas-impervious mixed metal oxide material of a perovskite structure may be deposited on a solid material which is porous to reactant and/or product gases and which functions as a support for the perovskite containing material. Any of a large number of oxides, including yttria-stabilized zirconia, doped ceria, thoria-based materials, or doped bismuth oxides, also useful as oxygen-conducting materials, and various other metal oxides may be used. Examples include CaO-stabilized $ZrO_2$; $Y_2O_3$-stabilized $ZrO_2$; $Sc_2O_3$-stabilized $ZrO_2$; $Y_2O_3$-stabilized $Bi_2O_3$; $Y_2O_3$-stabilized $CeO_2$; CaO-stabilized $CeO_2$; $ThO_2$; $Y_2O_3$-stabilized $ThO_2$; $ThO_2$, $ZrO_2$, $Bi_2O_3$, $CeO_2$ or $HfO_2$ stabilized by the addition of any one of the lanthanide oxides or CaO; $Al_2O_3$; etc.

Catalyst and/or gas-impervious mixed metal oxide material of a perovskite structure may be deposited on a solid in electrochemical reactor cells according to this invention by any known technique, including vapor deposition and/or electrolyses plating onto a porous substrate, impregnation of a porous substrate, co-impregnation of a porous substrate. Useful techniques may include heat treating a formed precursor of a perovskite to form a stable structure, or until it is gas-tight, then attaching the resulting solid to a support structure and further heat treating to achieve a finished ceramic core. Particularly useful for loading catalyst into core channels according to this invention are techniques analogous to techniques used to prepare molecular sieve columns for gas chromatograph. Other techniques may also be useful so long as the supporting substrate permits oxygen-containing gas and hydrocarbyl-containing gas to contact the gas-impervious mixed metal oxide material of a perovskite structure.

In practice, oxidation processes according to the present invention may be conducted in any cross-flow reactor using cross-flow reactor cells having oxygen permeable monolithic cores to control and facilitate transport of oxygen from an oxygen-containing gas stream to oxidation reactions of organic compounds in another gas stream.

Oxygen-containing gas steams which flow across the gas-impervious mixed metal oxide materials in ceramic cores of this invention can be air, pure oxygen, or any other gas containing at least about 1 mol percent free oxygen. In another embodiment, the oxygen-containing gas stream contains oxygen in other forms such as $N_2O$, NO, $SO_2$, $SO_3$, steam, $CO_2$, etc. Preferably, the oxygen-containing gas steam contains at least about 1 mol percent free oxygen and more preferably the oxygen-containing gas steam is air.

As mentioned above, processes according to the present invention include processes for preparing systhesis gas by reacting oxygen from an oxygen-containing gas stream with a hydrocarbyl compound in another gas stream without contaminating the hydrocarbyl compound and/or products of oxidation with other gases from the oxygen-containing gas stream, such nitrogen from an air stream. Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons. Synthesis gas produced by the partial oxidation of methane, for example, is an exothermic reaction and produces synthesis gas having a useful ratio of hydrogen to carbon monoxide, according to the following equation:

$$CH_4 + 1/2 O_2 \rightarrow 2H_2 + CO$$

Preferred embodiments include processes for preparing synthesis gas by partial oxidation of any vaporizable hydrocarbyl compound. Hydrocarbyl compound used in processes of this invention suitably comprises one or more gaseous or vaporizable compounds that can be reacted with molecular oxygen or carbon dioxide to form synthesis gas. Most suitably, the hydrocarbyl compound is a hydrocarbon such as methane and/or ethane, however, various amounts of oxygen or other atoms can also be in the hydrocarbyl molecule. For example, hydrocarbyl compounds that can be converted to synthesis gas include methanol, dimethyl ether, ethylene oxide, and the like. However, the most preferable hydrocarbyl compounds are the low molecular weight hydrocarbons containing about 1 to about 20 carbons, more preferably 1 to about 10 carbon atoms. Methane, natural gas, which is mainly methane, or other light hydrocarbon mixtures which are readily available, inexpensive, are particularly preferred hydrocarbyl feed materials for processes of this invention. The natural gas can be either wellhead natural gas or processed natural gas. Composition of processed natural gas varies with the needs of the ultimate user. A typical processed natural gas composition contains about 70 percent by weight of methane, about 10 percent by weight of ethane, 10 percent to 15 percent of $CO_2$, and the balance is made up of smaller amounts of propane, butane and nitrogen. Mixtures of hydrocarbyl and/or hydrocarbon compounds can also be used.

Light hydrocarbon gas streams can be mixed with any inert diluent such as nitrogen, helium, neon, argon, krypton, xenon, or other gas, including steam, which does not interfere with the desired reaction. Nitrogen and steam are diluents of choice.

Typically for a process in which synthesis gas is made from methane, ethane, and other light hydrocarbon gases in the presence of a catalyst, the catalyst is within the electrochemical reactor, generally, within the electrochemical reactor cell. However, decisions as to which zones to use for oxygen-containing gas stream and the other gas stream, and the location of catalyst and inert support, if any, will depend on which arrangement is most suitable for the particular application of the present invention. Determination of an optimal arrangement is well within the ability of one of ordinary skill to obtain without undue experimentation.

EXAMPLES OF THE INVENTION

The following examples are being presented to illustrate certain embodiments of the invention disclosed herein; however, they should not be construed as limiting the scope thereof.

GENERAL

All the dense phase ceramic tubes were adapted for testing in conversion of methane by the following procedure. Tube dimensions were 6.35 mm OD×4.88 mm ID and, typically, about 30 cm length. Tube ends, inside and out, were painted with a gas-impervious metallic paint to limit any oxygen transfer at the seals and to contribute some superficial structural integrity. The malleable metal ferrules used to seat against the metallic paint were designed for use at high temperatures of reaction and fabricated of materials soft enough not to crack the ceramic tube when the ferrules were compressed onto the tube ends. Development of coke deposits on stainless steel surfaces exposed to organic containing gas at reaction conditions, such as in compression end fittings, where prevented by coating these surfaces with the inert metallic paint. Alternatively, for runs in which seals to the ceramic tubes ends were not subjected to high temperatures, inert quartz tubes were cemented to the ceramic tubes. A pressure above ambient, typically about 6 in $H_2O$ head, was maintained in the ceramic tube reactor by means of a downstream water bubblier.

The methane conversion test unit monitored all process conditions and collected experimental data. The unit was controlled with commercially available process control software using a Micro VAX 2000 computer. On-line gas analysis was provided by a Hewlett-Packard 5890 gas chromatograph with VG Multichrom GC software operated on a Micro VAX II computer. Reactor effluent gas was analyzed from slip-steam gas samples. A 5 Å molecular sieve column ($\frac{1}{8}$ in dia $\times$ 1.5 ft) was used to separate argon (internal standard) nitrogen, methane, and carbon monoxide. A Porpak N column ($\frac{1}{8}$ in dia $\times$ 10 ft) was used to separate carbon dioxide. These columns were configured to a 10 port Valco valve to control gas separation. A thermal conductivity detector measured peak areas.

Generally, catalysts for methane conversion, containing from about 0.75 to about 1.25 weight percent transition metal in a hydrotalcite-like material, are loaded in a ceramic reactor in a plug flow arrangement with quartz wool packing holding the catalyst bed in position.

Typically, feed gas containing 20 mol percent argon and 80 mol percent methane was fed through the reactor at a flow rate of about 2 $cm^3$/min to about 14 $cm^3$/min measured at ambient temperature and near ambient pressure. Several steps of increasing reaction temperature in a range from 450° C. to 730° C. and, in some runs, to higher temperatures were included in each run. At each step of temperature, gas samples were taken and analyzed by GC at various time intervals of several minutes.

Example 1

Using the indirect method for making a ceramic core of a mixed metal oxide material having a perovskite structure, a 1.5 kg amount of cobalt nitrate hexahydrate, $Co(NO_3)_2.6H_2O$, was dissolved in about 0.5 kg of methanol, $CH_3OH$. Gravimetric analysis of this solution determined the cobalt concentration was $2.56 \times 10^{-3}$ gram atoms of cobalt per gram of solution. Into a 1000 mL Nalgeen container were placed a 584.79 g amount of the cobalt solution 442.86 g of strontium carbonate, $SrCO_3$, and 239.55 g iron oxide, $Fe_2O_3$, along with Zirconia milling media. The container was placed on rollers and the contents ball-milled for about 16 hr. The resulting slurry was recovered from the container, dried in a Pyrex dish on a hot plate to a past like consistency, and then in a drying oven at about 90° C. in air. The resulting solid was crushed to a powder which passed through a #60 mesh screen. The powder was calcined at a temperature of 850° C. for a period of 8 hr in stagnant air. The powder was cooled to ambient temperature and the steps of crushing and calcining were repeated. The resulting ceramic powder was characterized by XRD and SEM analysis, and the particle size distribution measured using a laser light scattering technique. This ceramic powder was found to have the oxide formula of $SrCo_{0.5}FeO_x$ and the desired perovskite structure. The ceramic powder was then ready to be used in fabrication of a solid ceramic core.

Example 2

First in fabrication of the solid ceramic core was to prepare a slip which consisted of the ceramic powder mixed with solvent and binder, dispersant, and plasticizer additives. The solvent used was a mixture of xylene and butanol mixed in the ratio of 89 g of xylene and 22 g butanol. The binder used was a thermosetting acryloid resin identified as AT-51 by supplier Rohm-Hass Co. As supplied AT-51 is 50 weight percent active resin in xylene-butanol solvent. The dispersant used was fish oil obtained from Kellogg Co. and diluted 20 percent in xylene-butanol solvent. The plasticizer used was a liquid identified as Santicizer-160 by supplier Monsanto. Into a 1000 mL Nalgeen container were placed a 200 g amount of the ceramic powder, 60.2 g of xylene-butanol solvent, 78/22, and 22.4 g binder AT-51, 10.93 g plasticizer S-160, 6.78 g dilute fish oil along with Zirconia milling media. The container was placed on rollers and the contents ball-milled for about 16 hr. Slip was recovered from the container and then de-aerated in a vacuum chamber. The resulting slip was cast into a thin tape using a doctor blade technique in which an adjustable blade moves over an amount of slip on a level glass plate to spread the slip into the form of a thin tape. Solvent was removed from the tape by evaporation in air at room temperature for a period of 25 min. The resulting material was further blended in a Barbender mixer to obtain a workable plastic mass which was extruded through a steel die with an adjustable insert to form a green ceramic tube. The green tube was heated slowly to remove binder and other volatile organic compounds prior to sintering the tube at a temperature of 1175° C. for a period of 5 hr in an oxygen atmosphere. The resulting ceramic core was characterized by XRD and SEM analysis. This ceramic core, identified as Core SCF-2, was found to have an oxide formula $SrCo_{0.5}FeO_x$ and the desired perovskite structure.

Example 3

A mixed metal oxide ceramic powder having a perovskite structure and oxide formula $SrCo_{0.8}Fe_{0.2}O_x$ was made using the method of Example 1 except that appropriate amounts of $SrCO_3$, $Co(NO_3)_2.6H_2O$, and $Fe(NO_3)_3.9H_2O$ were mixed and milled in methanol with $ZrO_2$ media for 20 hr.. A ceramic core was fabricated from the resulting ceramic powder by the method of Example 2 and identified as Core SCF-3.

Example 4

A mixed metal oxide ceramic powder having a perovskite structure and oxide formula $La_{0.2}Sr_{0.8}Co_{0.4}Fe_{0.6}O_x$ was made using the method of Example 1. The source of lanthanum used in preparation of this ceramic powder was lanthanum carbonate, $La_2(CO_3)_3$. A ceramic core was fabricated from the resulting ceramic powder by the method of Example 2 and identified as Core LSCF-4.

Example 5

The ceramic core identified as Core SCF-2 is tested in the methane conversion unit as described above. During testing for this example the ceramic core contains a bed of catalyst, 0.5 g, sized to 20/40 mesh size. The methane gas feed rate is 2.1 $cm^3$/min at standard conditions. At a 850° C. temperature and methane conversion of 99 mol percent the selectivity to hydrogen, carbon monoxide and carbon dioxide are, respectively, 180 mol percent, 92 mol percent, and 8 mol percent based on a mole of methane. Conversion of oxygen transported as oxygen ions through gas-impervious wall is 100 mol percent. During this run, permeation of oxygen is at rates of about 0.1 cm/min (0.1 cm$^3$/min at standard conditions per cm$^2$ of wall area).

Example 6

In this example ceramic core identified as Core SCF-2 is again tested in the methane conversion unit as described above. During testing for this example, however, the ceramic core contains a bed of catalyst, 0.5 g, sized to 20/40 mesh size. The methane gas feed rate is 3.6 cm$^3$/min at standard conditions. At a 800° C. temperature and methane conversion of 30 mol percent the selectivity to hydrogen, carbon monoxide and carbon dioxide are, respectively, 186 mol percent, 98 mol percent, and 2 mol percent based on a mole of methane. Conversion of oxygen transported as oxygen ions through gas-impervious wall is 100 mol percent. During this run, permeation of oxygen is at rates of about 0.043 cm/min.

Example 7

In this example a ceramic core made according to the method of Example 2 and identified as Core SCF-2A is tested in the methane conversion unit as described above. During testing for this example, however, the ceramic core contains a bed of catalyst, 0.42 g, sized to 20/40 mesh size. The methane gas feed rate is 3.7 cm$^3$/min at standard conditions. At a 850° C. temperature and methane conversion of 100 mol percent the selectivity to hydrogen, carbon monoxide and carbon dioxide are, respectively, 126 mol percent, 72 mol percent, and 28 mol percent based on a mole of methane. Conversion of oxygen transported as oxygen ions through gas-impervious wall is 100 mol percent. During this run, permeation of oxygen is at rates in a range from about 0.2 cm/min to about 0.4 cm/min.

Example 8

In this example ceramic core identified as Core SCF-3 is tested in the methane conversion unit as described above. During testing for this example the ceramic core contains a bed of catalyst, 0.25 g, sized to 20/40 mesh size. The methane gas feed rate is 14 cm$^3$/min at ambient conditions. Testing includes seven steps of increasing reaction temperature from 450° C. to 730° C. Methane conversion increases stepwise with increasing temperature of reaction from of 5 mol percent to 38 mol percent. At a 730° C. average temperature methane conversion is 38 mol percent and selectivities to hydrogen, carbon monoxide and carbon dioxide are, respectively, 180 mol percent, 92 mol percent, and 8 mol percent based on a mole of methane. Conversion of oxygen transported as oxygen ions through gas-impervious wall is 100 mol percent. During this run, permeation of oxygen is at rates in a range from about 0.5 cm/min to about 3.5 cm/min.

That which is claimed is:

1. An electrochemical reactor cell for reacting oxygen from an oxygen-containing gas stream with hydrocarbyl compounds in another gas stream which comprises a gas stream defining a direction of steam flow containing either the oxygen-containing gas or the hydrocarbyl compounds and positioned therein a ceramic core having an outer surface including a flat entrance surface and a flat exit surface spaced apart from and parallel to the entrance surface, and at least one core channel therebetween for flow of one or more gases from the entrance surface to the exit surface and defining a direction of channel flow which direction is non parallel to the direction of stream flow, wherein each channel has at least one channel wall disposed between the channel and a portion of the outer surface of the ceramic core comprising a gas-impervious mixed metal oxide material of a perovskite structure having electron conductivity and oxygen ion conductivity. and wherein the reactor cell is free of means for completion of an external electric circuit.

2. The electrochemical reactor cell according to claim 1 wherein the direction of stream flow and the direction of channel flow are transverse to one another, and the electrochemical reactor cell further comprising an entrance manifold means in flow communication with the channel or channels at the entrance surface of at least one ceramic core and an exit manifold means in flow communication with the same channel or channels at one or more exit surface and thereby in flow communication with entrance manifold means.

3. The electrochemical reactor cell according to claim 1 wherein the electrochemical reactor cell further comprising an oxidation catalyst.

4. The electrochemical reactor cell according to claim 1 wherein the ceramic core comprises an inert support.

5. The electrochemical reactor cell according to claim 1 wherein the mixed metal oxide material of a perovskite structure comprises a combination of metals selected from the group consisting of chemical elements having atomic numbers 4, 12, 20 to 31, 38 to 41, and 56 to 71 inclusive.

6. An electrochemical reactor for reacting oxygen from an oxygen-containing gas stream with hydrocarbyl compounds in another gas stream which comprises;

a vessel having an entrance port, an exit port, and a passageway therebetween for stream flow of one or more gases from the entrance port to the exit port defining a direction of stream flow, and at least one electrochemical reactor cell positioned within the vessel comprising a ceramic core having an outer surface including a flat entrance surface and a flat exit surface spaced apart from and parallel to the entrance surface, and at least one core channel therebetween for flow of one or more gases from the entrance surface to the exit surface and defining a direction of channel flow which direction is non parallel to the direction of stream flow, wherein each channel has at least one channel wall disposed between the channel and a portion of the outer surface of the ceramic core comprising a gas-impervious mixed metal oxide material of a perovskite structure having electron conductivity and oxygen ion conductivity. and wherein the reactor cell is free of means for completion of an external electric circuit, the electrochemical reactor cell further comprising an entrance manifold means in flow communication with the channel or channels at the entrance surface of at least one ceramic core and an exit manifold means in flow communication with the same channel or channels at one or more exit surface and thereby in flow communication with entrance manifold means, and wherein the vessel and the electrochemical reactor cell together form a first zone for introducing, reacting at least one compound therein and expelling a first gas or gas mixture and wherein the entrance manifold means, the core channel or channels and the exit manifold means form a second zone within the electrochemical reactor for introducing, reacting at least one compound therein and expelling a second gas or gas mixture.

7. The electrochemical reactor according to claim 6 wherein each channel comprises at least one wall which disposed between the channel and a portion of the outer surface of the core and substantially parallel to the direction of channel flow, and wherein the direction of stream flow and the direction of channel flow are transverse to one another.

8. The electrochemical reactor according to claim 6 wherein the mixed metal oxide material of a perovskite structure is made by a process which comprises the steps of (A) forming an intimate multi-phase mixture of an aqueous and/or organic liquid having a low normal boiling point temperature and selected solid compounds which are precursors of the gas-impervious mixed metal oxide material of a perovskite structure having electron conductivity and oxygen ion conductivity the precursor compounds selected from a first group consisting of acetates, carbonates, nitrates and oxides of elements having atomic numbers 12, 20, 38, 39, and 56 to 71 inclusive and precursor compounds selected from a second group consisting of acetates, carbonates, nitrates and oxides of elements having atomic numbers 21 to 30, (B) calcining the mixture to temperatures in a range upward from about 500° C. to form the desired ceramic material, (C) crushing the ceramic material to form a ceramic powder, (D) forming an intimate multi-phase mixture of an aqueous and/or organic liquid having a low normal boiling point temperature, the ceramic powder, and additives selected from the group consisting of binders, dispersants, plasticizers, and combinations thereof, (E) forming the mixture into a desired shape, and (F) sintering the formed mixture to temperatures in a range upward from about 800° C. to for a dense, solid and gas-impervious mixed metal oxide material of a perovskite structure having electron conductivity and oxygen ion conductivity.

9. The electrochemical reactor according to claim 6 wherein the gas-impervious mixed metal oxide material is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$ and an X-ray identifiable perovskite crystalline phase.

10. An electrochemical reactor cell for reacting oxygen from an oxygen-containing gas stream with hydrocarbyl compounds in another gas stream, comprising a ceramic core having a flat first entrance surface, a flat first exit surface spaced apart from and parallel to the first entrance surface, and a first plurality of core channels therebetween for flow of an oxygen-containing gas stream from the first entrance surface to the first exit surface operable to define a first direction of channel flow, and having a flat second entrance surface, a flat second exit surface spaced apart from and parallel to the second entrance surface, and a plurality of core channels therebetween for flow of the other gas stream containing a least one hydrocarbyl compound from the second entrance surface to the second exit surface operable to define a second direction of channel flow which direction is non parallel to the first direction of channel flow, wherein each channel has a portion of channel wall disposed between the oxygen-containing gas stream and the another gas stream comprising a gas-impervious mixed metal oxide material of a perovskite structure having electron conductivity and oxygen ion conductivity, and wherein the reactor cell is free of means for completion of an external electric circuit.

11. The electrochemical reactor cell according to claim 10 wherein each channel of the first plurality of core channels comprises at least one wall which is generally planar and disposed parallel to the first direction of channel flow and each channel of the second plurality of core channels comprises at least one wall which is generally planar and disposed parallel to the second direction of channel flow, and wherein the first plurality of core channels and the second plurality of core channels are disposed transverse to one another.

12. An electrochemical reactor for reacting oxygen from an oxygen-containing gas stream with hydrocarbyl compounds in another gas stream which comprises;

at least one electrochemical reactor cell comprising a ceramic core having a flat first entrance surface, a flat first exit surface spaced apart from and parallel to the first entrance surface, and a first plurality of core channels therebetween for flow of an oxygen-containing gas stream from the first entrance surface to the first exit surface operable to define a first direction of channel flow, the ceramic core also having a flat second entrance surface, a flat second exit surface spaced apart from and parallel to the second entrance surface, and a second plurality of core channels therebetween for flow of the other gas stream from the second entrance surface to the second exit surface operable to define a second direction of channel flow which direction is non parallel to the first direction of channel flow, wherein each channel has a portion of channel wall disposed between the oxygen-containing gas stream and the other gas stream comprising a gas-impervious mixed metal oxide material of a perovskite structure having electron conductivity and oxygen ion conductivity. and wherein the reactor cell is free of means for completion of an external electric circuit, and the electrochemical reactor cell further comprising a first entrance manifold means in flow communication with first plurality of core channels at the first entrance surface and a first exit manifold means in flow communication with the same channels at the first exit surface, thereby in flow communication with first entrance manifold means, and a second entrance manifold means in flow communication with second plurality of core channels at the second entrance surface and a second exit manifold means in flow communication with the same channels at the second exit surface, thereby in flow communication with second entrance manifold means, and wherein the first entrance manifold means, plurality of core channels and exit manifold means together form a first zone for introducing a first gas or gas mixture, reacting at least one compound therein and expelling a first gas or gas mixture and the second entrance manifold means, plurality of core channels and exit manifold means together form a second zone for introducing it second gas or gas mixture, reacting at least one compound therein and expelling a second gas or gas mixture.

13. The electrochemical reactor according to claim 12 wherein the electrochemical reactor cell further comprising a catalyst.

14. The electrochemical reactor according to claim 12 wherein the ceramic core comprises an inert support.

15. The electrochemical reactor according to claim 12 wherein the mixed metal oxide material of a perovskite structure is made by a process which comprises the steps of (A) forming an intimate multi-phase mixture of an aqueous and/or organic liquid having a low normal boiling point temperature and selected solid compounds which are precursors of the gas-impervious mixed metal oxide material of a perovskite structure having electron conductivity and oxygen ion conductivity the precursor compounds selected from a first group consisting of acetates, carbonates, nitrates and oxides of elements having atomic numbers 12, 20, 38, 39, and 56 to 71 inclusive and precursor compounds selected from a second group consisting of acetates, carbonates, nitrates and oxides of elements having atomic numbers 21 to 30, (B) calcining the mixture to temperatures in a range upward from about 500° C. to form the desired ceramic material, (C) crushing the ceramic material to form a ceramic powder, (D) forming an intimate multi-phase mixture of an aqueous and/or organic liquid having a low normal boiling point temperature, the ceramic powder, and additives selected from the group consisting of binders, dispersants, plasticizers, and combinations thereof, (F) forming the mixture into a desired shape, and (G) sintering the formed mixture to temperatures in a range upward from about 800° C. to form a dense, solid and gas-impervious mixed metal oxide material of a perovskite structure having electron conductivity and oxygen ion conductivity.

16. The electrochemical reactor according to claim 12 wherein the gas-impervious mixed metal oxide material is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$ and an X-ray identifiable perovskite crystalline phase.

17. An electrochemical process for partial oxidation of at least one hydrocarbyl compound in a gas stream with oxygen from another gas stream which comprises the steps of (A) providing an electrochemical reactor which comprises;
    a vessel having an entrance port, an exit port, and a passageway therebetween for stream flow of one or more gases from the entrance port to the exit port and defining a direction of stream flow, and
    at least one electrochemical reactor cell positioned within the vessel comprising a ceramic core having an outer surface including a flat entrance surface and a flat exit surface spaced apart from and parallel to the entrance surface, and at least one core channel therebetween for flow of one or more gases from the entrance surface to the exit surface and defining a direction of channel flow which direction is non parallel to the direction of stream flow, wherein each channel has at least one channel wall disposed between the channel and a portion of the outer surface of the ceramic core comprising a gas-impervious mixed metal oxide material of a perovskite structure having electron conductivity and oxygen ion conductivity. and wherein the reactor cell is free of means for completion of an external electric circuit, the electrochemical reactor cell further comprising an entrance manifold means in flow communication with the channel or channels at the entrance surface of at least one ceramic core and an exit manifold means in flow communication with the same channel or channels at one or more exit surface and thereby in flow communication with entrance manifold means, and wherein the vessel and the electrochemical reactor cell together form a first zone for introducing, reacting at least one compound therein and expelling a first gas or gas mixture and wherein the entrance manifold means, the core channel or channels and the exit manifold means form a second zone within the electrochemical reactor for introducing, reacting at least one compound therein and expelling a second gas or gas mixture, (B) controlling temperatures within the electrochemical reactor to temperatures in a range from about 400° C. to about 1400° C., (C) introducing an oxygen-containing gas stream into either the first or second zone, reacting and transferring oxygen through the ceramic into the other zone, and expelling a residue of the oxygen-containing gas stream, and (D) introducing a gas stream containing a hydrocarbyl compound or compounds into the other zone, reacting at least one of the hydrocarbyl compounds with the oxygen transferred into the zone to form partial oxidation products, and expelling a product-containing gas mixture.

18. The process according to claim 17 wherein partial oxidation of at least one hydrocarbyl compound selected from the group consisting of methane, ethane, and other light hydrocarbon gases is carried out at temperatures within the electrochemical reactor in a range from about 1000° C. to about 1400° C., and the process further comprising (E) recovering from the product-containing gas mixture a synthesis gas comprising hydrogen and carbon monoxide.

19. The process according to claim 17 wherein the partial oxidation of at least one hydrocarbyl compound selected from the group consisting of methane, ethane, and other light hydrocarbon gases is carried out in the presence of a catalyst at temperatures within thee electrochemical reactor in a range from about 450° C. to about 1250° C., and the process further comprising (E) recovering from the product-containing gas mixture a synthesis gas comprising hydrogen and carbon monoxide.

20. The process according to claim 19 wherein the gas-impervious mixed metal oxide material is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$ and an X-ray identifiable perovskite crystalline phase.

21. An electrochemical process for partial oxidation of at least one hydrocarbyl compound in a gas stream with oxygen from another gas stream which comprises the steps of (A) providing an electrochemical reactor which comprises at least one electrochemical reactor cell comprising a ceramic core having a flat first entrance surface, a flat first exit surface spaced apart from and parallel to the first entrance surface, and a first plurality of core channels therebetween for flow of an oxygen-containing gas stream from the first entrance surface to the first exit surface operable to define a first direction of channel flow, the ceramic core also having a flat second entrance surface, a flat second exit surface spaced apart from and parallel to the second entrance surface, and a second plurality of core channels therebetween for flow of the other gas stream from the second entrance surface to the second exit surface operable to define a second direction of channel flow which direction is non parallel to the first direction of channel flow, wherein each channel has a portion of channel wall disposed between the oxygen-containing gas stream and the other gas stream comprising a gas-impervious mixed metal oxide material of a perovskite structure having electron conductivity and oxygen ion conductivity, and wherein the reactor cell is free of means for completion of an external electric circuit, and the electrochemical reactor cell further comprising a first entrance manifold means in flow communication with the first plurality of core channels at the first entrance surface and a first exit manifold means in flow communication with the same channels at the first exit surface, thereby in flow communication with first entrance manifold means, and a second entrance manifold means in flow communication with second plurality of core channels at the second entrance surface and a second exit manifold means in flow communication with the same channels at the second exit surface, thereby in flow communication with second entrance manifold means, and wherein the first entrance manifold means, plurality of core channels and exit manifold means together form a first zone for introducing, reacting oxygen in the oxygen-containing gas and expelling a residue gas or gas mixture and the second entrance manifold means, plurality of core channels and exit manifold means together form a second zone for introducing, reacting at least one compound therein and expelling a residue of the oxygen-containing gas stream, (B) controlling temperatures within the electrochemical reactor to temperatures in a range from about 400° C. to about 1400° C., (C) introducing an oxygen-containing gas stream into the first zone, reacting and transferring oxygen through the ceramic into the other zone, and expelling a residue of the oxygen-containing gas stream, and (D) introducing a gas stream containing a hydrocarbyl compound or compounds into the other zone, reacting at least one of the compounds with the oxygen transferred into the zone to form partial oxidation products, and expelling a product-containing gas mixture.

22. The process according to claim 21 wherein partial oxidation of at least one hydrocarbyl compound selected from the group consisting of methane, ethane, and other light hydrocarbon gases is carried out at temperatures within the electrochemical reactor in a range from about 1000° C. to about 1400° C., and the process further comprising (E) recovering from the product-containing gas mixture a synthesis gas comprising hydrogen and carbon monoxide.

23. The process according to claim 21 wherein the partial oxidation of at least one hydrocarbyl compound selected from the group consisting of methane, ethane, and other light hydrocarbon gases is carried out in the presence of a catalyst at temperatures within the electrochemical reactor in a range from about 450° C. to about 1250° C., and the process further comprising (E) recovering from the product-containing gas mixture a synthesis gas comprising hydrogen and carbon monoxide.

24. The process according to claim 23 wherein the gas-impervious mixed metal oxide material is selected from the group consisting of materials having formulae $SrCo_{0.8}Fe_{0.2}O_x$, $SrCo_{0.5}FeO_x$ and $La_{0.2}Sr_{0.8}Co_{0.4}Fe_{0.6}O_x$ and an X-ray identifiable perovskite crystalline phase.

* * * * *